(12) United States Patent
Son

(10) Patent No.: US 7,909,521 B2
(45) Date of Patent: Mar. 22, 2011

(54) DIRECTION ADJUSTABLE CAMERA WITH MAGNETIC MOUNTING

(76) Inventor: Kyong-Sik Son, Seoul (KR)

( * ) Notice: Subject to any disclaimer, the term of this patent is extended or adjusted under 35 U.S.C. 154(b) by 157 days.

(21) Appl. No.: 12/185,814

(22) Filed: Aug. 5, 2008

(65) Prior Publication Data

US 2010/0034530 A1  Feb. 11, 2010

(51) Int. Cl.
   *F16M 11/14* (2006.01)
(52) U.S. Cl. .................................... 396/428; 248/181.1
(58) Field of Classification Search ............... 396/427, 396/428
   See application file for complete search history.

(56) References Cited

U.S. PATENT DOCUMENTS

| | | | |
|---|---|---|---|
| 7,556,228 B2 * | 7/2009 | Liow et al. | 248/206.5 |
| 7,628,551 B2 * | 12/2009 | Leyden et al. | 396/427 |
| 2004/0118985 A1 * | 6/2004 | Omps | 248/181.1 |
| 2005/0247845 A1 * | 11/2005 | Li et al. | 248/346.5 |
| 2007/0114346 A1 * | 5/2007 | Omps | 248/181.1 |
| 2009/0196597 A1 * | 8/2009 | Messinger et al. | 396/427 |

* cited by examiner

*Primary Examiner* — Clayton E Laballe
*Assistant Examiner* — Leon W Rhodes
(74) *Attorney, Agent, or Firm* — John K. Park; Park Law Firm

(57) ABSTRACT

A monitoring camera includes a camera portion that senses image of an object, a base and a shooting angle change device that connects the camera portion and the base with magnetic force. The shooting angle change device can change the shooting direction of the camera portion along X-axis, Y-axis, and Z-axis. The shooting angle change device includes a curved rotation guide surface that is formed on the base, a rotation surface that is formed on the camera portion, a magnet that is provided inside one of the camera portion and the rotation guide surface and an attaching member that is provided inside the other of the camera portion and the rotation guide surface. The rotation surface contacts the rotation guide surface. The rotation surface can be rotated relative to the base. The attaching member is made of magnetic substance.

15 Claims, 5 Drawing Sheets

FIG. 1 [PRIOR ART]

DIRECTION ADJUSTABLE CAMERA WITH MAGNETIC MOUNTING

BACKGROUND OF THE INVENTION

The present invention is related to a monitoring camera. More particularly, the invention is related to a magnetically mounted monitoring camera, the shooting direction of which is adjustable along any of the X, Y, Z axes, and a camera portion of which is conveniently exchanged.

FIG. 1 shows a monitoring camera by prior art. A bottom surface 11 of a circular base 10 includes a mounting hole (not shown) to mount the camera to a desired location, and an insertion hole 14 to insert wires, a boss 13 with a threaded hole 12. A bracket 20 includes a first piece 22 and a second piece 26 that are connected with a hinge. The bracket fixes the camera to the circular base to direct the camera toward area to be monitored. A fixing recess 21 is formed on the center of the first piece 22 to fix the camera 30. The first piece 22 includes a plurality of vertically extending first connecting pieces 23, each of which has a connecting hole 23a. The second piece 26 includes a plurality of vertically extending second connecting pieces 25, each of which has a connecting hole 27. A screw 28 passes through the connecting holes 23a, 27, and the first connecting piece contacts the second connecting piece, and they are pivotable around the X-axis thereby allowing a lens 31 of the camera 30 to change direction. The second piece 26 includes circumferential slot 24 to change the direction of the camera around the Y-axis. A screw 29 is inserted into the slot and engages with the threaded hole 12 thereby fixing the second piece 26 to the circular base 10. If the screw is not completely fastened, the camera may be rotated around the X-axis and the Y-axis to change the shooting direction. This prior art has disadvantages that the screws must be loosened and fastened again before and after redirecting the camera, and that direction change mechanism is complex, and that adjusting around the Z-axis is not possible resulting in 90 degree rotated image.

SUMMARY OF THE INVENTION

The present invention contrives to solve the disadvantages of the prior art.

An objective of the invention is to provide a monitoring camera that can be easily installed and adjusted in shooting direction.

Another objective of the invention is to provide a monitoring camera that can change direction in X-axis, Y-axis, and Z-axis, which are perpendicular with one another.

Still another objective of the invention is to provide a monitoring camera that needs change of only a camera portion when lenses exchange is required.

In order to achieve the above objective, the present invention provides a monitoring camera comprising a camera portion that senses image of an object, a base and a shooting angle change device that connects the camera portion and the base with magnetic force. The shooting angle change device can change the shooting direction of the camera portion along X-axis, Y-axis, and Z-axis while the camera portion and the base are connected with magnetic force.

The shooting angle change device comprises a curved rotation guide surface that is formed on the base, a rotation surface that is formed on the camera portion, a magnet that is provided inside one of the camera portion and the rotation guide surface and an attaching member that is provided inside the other of the camera portion and the rotation guide surface. The rotation surface contacts the rotation guide surface. The rotation surface can be rotated relative to the base. The attaching member is made of magnetic substance, whereby the rotation surface of the camera portion and the rotation guide surface of the base contact with each other.

The monitoring camera further comprises a position securing device that prevents movement of the camera portion relative to the base when external force is applied.

The position securing device comprises a friction member that is installed on either the rotation guide surface or the rotation surface.

The magnet comprises an exposed magnetic surface. The magnet is installed either in the base or in the camera portion so that the exposed magnetic surface is exposed toward either the rotation guide surface or the rotation surface. The exposed magnetic surface has the same curvature as the curvature of the rotation guide surface.

The magnet is installed inside the base. A magnet installation recess is provided so that the magnet can be inserted from a side that is opposite to the rotation guide surface. A magnetic shield plate is provided to prevent falling of the magnet that is installed in the magnet installation recess and to guide the magnetic force of the magnet toward the rotation guide surface. The magnetic shield plate is made of magnetic substance.

The rotation guide surface is formed on the end of a projection that protrudes vertically from a bottom surface of the base, wherein the rotation guide surface is provided at a height that enables the camera portion be rotated so that the shooting direction is parallel to the bottom surface, wherein either the magnet or the attaching member is provided in an area that keeps magnetic attachment when the shooting direction of the camera portion is parallel to the bottom surface.

The camera portion includes a camera lens device and a rotating body that supports the camera lens device and includes the rotation surface.

In one embodiment, the magnet is installed in the base and the rotating body is made of non-magnetic substance. The attaching member is separately installed in the rotating body.

In another embodiment, the magnet is installed in the base. The attaching member is formed as the rotating body itself.

In still another embodiment, the magnet is installed in the rotating body. The attaching member is made of ferromagnetic substance and formed as the base itself.

In still another embodiment, the magnet is installed in the rotating body, and the attaching member is separately provided in the base. The base is made of non-magnetic substance.

The rotating body is injection-molded with plastic and the attaching member is embedded in the molded rotating body.

The rotating body has a spherical shape. The rotating body is made as a hollow sphere with an opening. The camera lens device is installed inside the rotating body. The camera lens device comprises a lens that is exposed through the opening.

The monitoring camera further comprises a magnetic shield that prevents magnetic filed from reaching the camera lens device.

The magnetic shield is made of aluminum and dissipates heat.

The advantages of the present invention are: (1) the shooting direction can be freely changed without using a tool along the three dimensional axes; (2) the camera portion can be very easily replaced; (3) the spherically shaped camera portion facilitates assembly and disassembly and wide shooting angle; (4) the monitoring camera keeps the adjusted state against unwanted external force; (5) magnetic shields prevent malfunction of the filter change motor and the auto iris motor; (6) the shooting angle is maximized; (7) the magnetic filed of the magnet does not leak to unnecessary positions; (8) the present invention facilitates installation on dangerous and difficult to access locations.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
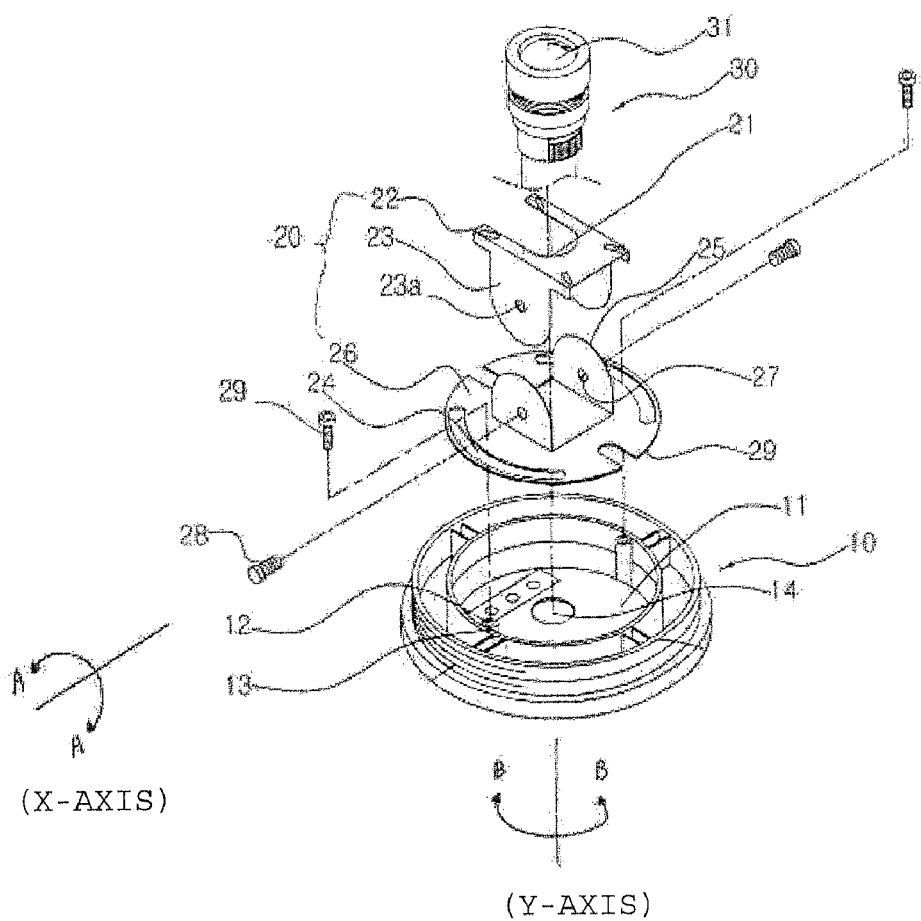
FIG. 1 is an exploded perspective view showing a monitoring camera by prior art.

FIGS. 2~5 show that a monitoring camera of the present invention includes a camera portion 900 that takes photographs of a target, a base 200, and a shooting angle change device that magnetically connects the camera portion 900 and the base 200 and enables three axis pivoting motion of the camera portion 900 with respect to the base 200. Change of direction does not require a tool. The present invention does not have the problem of the 90 degree rotated image since the camera portion can be adjusted to any direction around X-axis, Y-axis and Z-axis.

The shooting angle change device includes a rotation guide surface 211 that is provided on the base 200 and has a concave spherical shape; a rotation surface 111 that is provided on the camera portion 900, has a convex spherical shape, and contacts the rotation guide surface 211 so that the camera portion can be rotated relative to the base 200; a magnet 310 that is installed either inside the camera portion 900 or inside the rotation guide surface 211; an attaching member that is provided on the other place and is magnetically pulled by the magnet 310 so that the rotation guide surface 211 and the rotation surface 111 contact with each other; and a position securing device that prevents the camera portion 900 from rotating relative to or falling from the base 200 when external shock or vibration is applied.

The position securing device includes a friction member 250 that is provided at least on one of the rotation guide surface 211 and the rotation surface 111.

The friction member 250 includes an O-ring that is made of silicone, synthetic rubber or CR. After the shooting direction of the camera portion 900 is changed, unless there is a secondary adjusting, the magnetic force and the friction member 250 keeps the adjusted state against external vibration or shock.

The magnet 310 includes an exposed magnet surface 311 that has a concave curvature that is the same with the curvature of the rotation guide surface 211. The friction member 250 is installed around the magnet 310 on the rotation guide surface 211 or the rotation surface 111.

In case that the magnet 310 is installed inside the base 200, a magnet installation recess 214 is provided so that the magnet 310 can be inserted from a side that is opposite to the rotation guide surface 211. A magnetic shield plate 330 is provided to prevent falling of the magnet that is installed in the magnet installation recess 214 and to guide the magnetic force of the magnet toward the rotation guide surface 211. The magnetic shield plate 330 is made of magnetic substance, and prevents the magnetic force from being directed to unnecessary positions.

The rotation guide surface 211 is formed on the end of a projection 213 that protrudes vertically from a bottom surface 200a of the base 200. The rotation guide surface 211 is provided at a height that enables the camera portion 900 be rotated so that the shooting direction is parallel to the bottom surface 200a. The magnet 310 or the attaching member is provided in an area that keeps magnetic attachment when the shooting direction of the camera portion 900 is parallel to the bottom surface 200a, thereby minimizing the blind spot and maximizing covered area. The camera portion 900 can record images by the infrared ray. A filter change motor 151 may remove an infrared ray blocking filter allowing infrared ray may be sensed. A camera lens device 100 of the camera portion 900 includes an integrated auto iris drive motor 150. A conventional camera lens device may be used for the camera lens device 100.

In one embodiment, the camera portion 900 includes the camera lens device 100 and a rotating body 110 that includes the rotation surface 111. The magnet 310 is installed in the base 200 and the rotating body 110 is made of non-magnetic substance. The attaching member is separately installed in the rotating body 110.

In another embodiment (not shown), the magnet 310 is installed in the rotating body 110, and the attaching member is made of ferromagnetic substance and formed as the base 200 itself.

In still another embodiment (not shown), the magnet 310 is installed in the rotating body 110, and the attaching member is separately provided in the base that is made of non-magnetic substance.

In case that the magnet 310 is installed in the base 200, the rotating body 110 is made of non-magnetic substance, and the attaching member is made of ferromagnetic substance and is provided in the rotating body 110. Specifically, the rotating body is injection-molded with plastic and the attaching member is embedded in the molded body.

Figure 2:
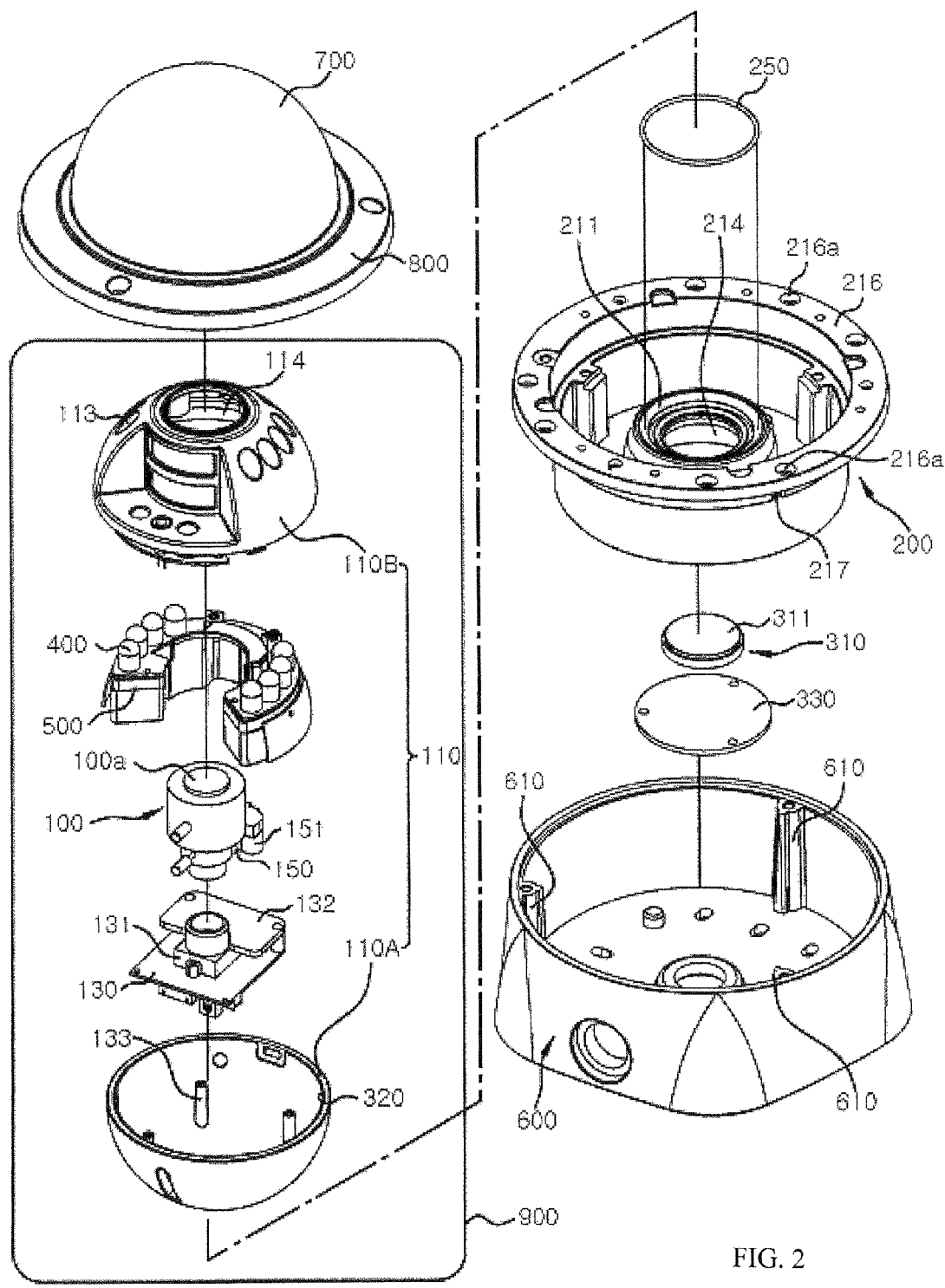
FIG. 2 is an exploded perspective view showing a monitoring camera by present invention.
Figure 3:
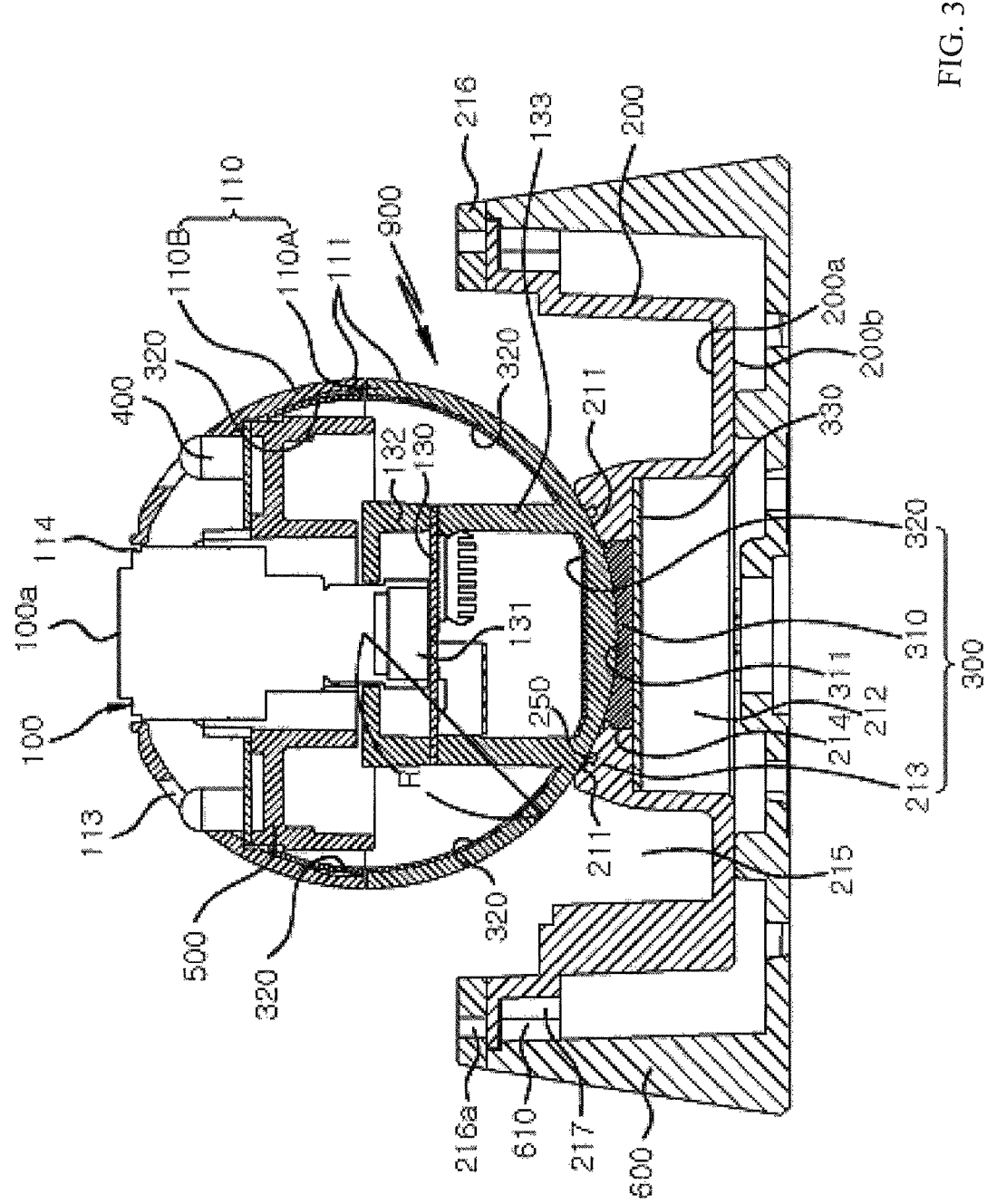
FIG. 3 is a cross-sectional view of the monitoring camera, wherein a camera portion is directed vertical to a base.
Figure 4:
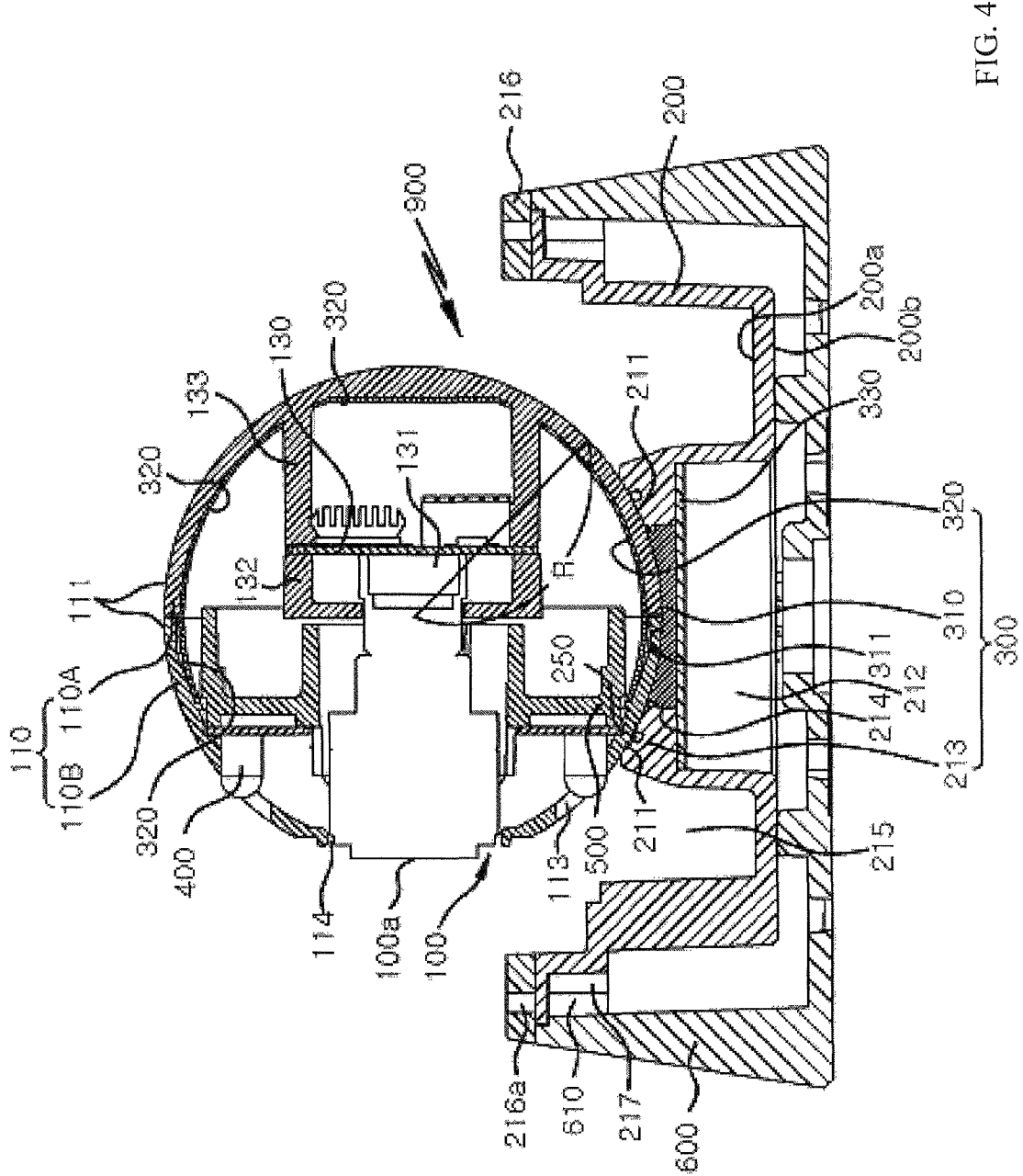
FIG. 4 is a cross-sectional view of the monitoring camera, wherein the camera portion is directed parallel to the base.

As shown in FIGS. 2 and 3, the rotating body 110 is molded as a first half spherical body 110A and a second half spherical body 110B. The two halves form a spherical body.

Preferably, the rotating body 110 is made as a sphere having a radius R for appearance and mobility. More preferably, the rotating body is made as a hollow sphere with an opening 114. The camera lens device 100 is installed inside the rotating body 110 with its lens 100a is exposed through the opening 114.

A flange 216 is provided at the periphery of the base 200. The flange 216 includes a plurality of fastener holes 216a. The flange is used when the base is not directly attached to a wall. A case 600 is provided to receive and surround the base 200. The flange 216 abuts with an open end of the case 600 and they are fastened with each other with bolts (not shown). The case 600 is installed on a wall or an object to which the monitoring camera is mounted. The case is designed as aesthetically pleasing and relieves the unpleasant feeling of being monitored. The case 600 has positioning projections 610 and the base has positioning recesses 217 to properly position the base on the case.

An infrared ray emitting source 400 is provided to enable night photographing even when there is no lighting. The source 400 includes infrared emitting LED's that are provided between the camera lens device 100 and the rotating body 110. A magnetic shield 500, which also functions as a heat sink, is provided to remove heat from the infrared ray emitting source 400 and to prevent the heat from adversely affecting the magnetic force of the magnet.

The magnetic shield 500 is made of aluminum. In case that the rotating body 110 is formed hollow, the shield 500 blocks magnetic field to reach the camera lens device 100 inside the rotating body 110.

The infrared ray emitting source 400 is exposed on the outer surface of the rotating body 110 via through holes 113 that are provided on the rotating body 110. A printed circuit board 130 is provided to carry an image sensing device that senses images formed by the camera lens device 100. An aluminum shield member 132 is installed above the printed circuit board 130 to block magnetic field or heat from the infrared ray emitting source to reach the printed circuit board 130.

The printed circuit board 130 is fixed on a support rib 133 that protrudes from the interior wall of the first half spherical body 110A through the attaching member 320.

The magnetic shield 500 and the shield member 132 surrounds the camera lens device 100 so that they prevent magnetic field from reaching to a filter change motor 151 and an auto iris motor 150 of the camera lens device thus preventing malfunctioning of the motors due to magnetization.

Figure 5:
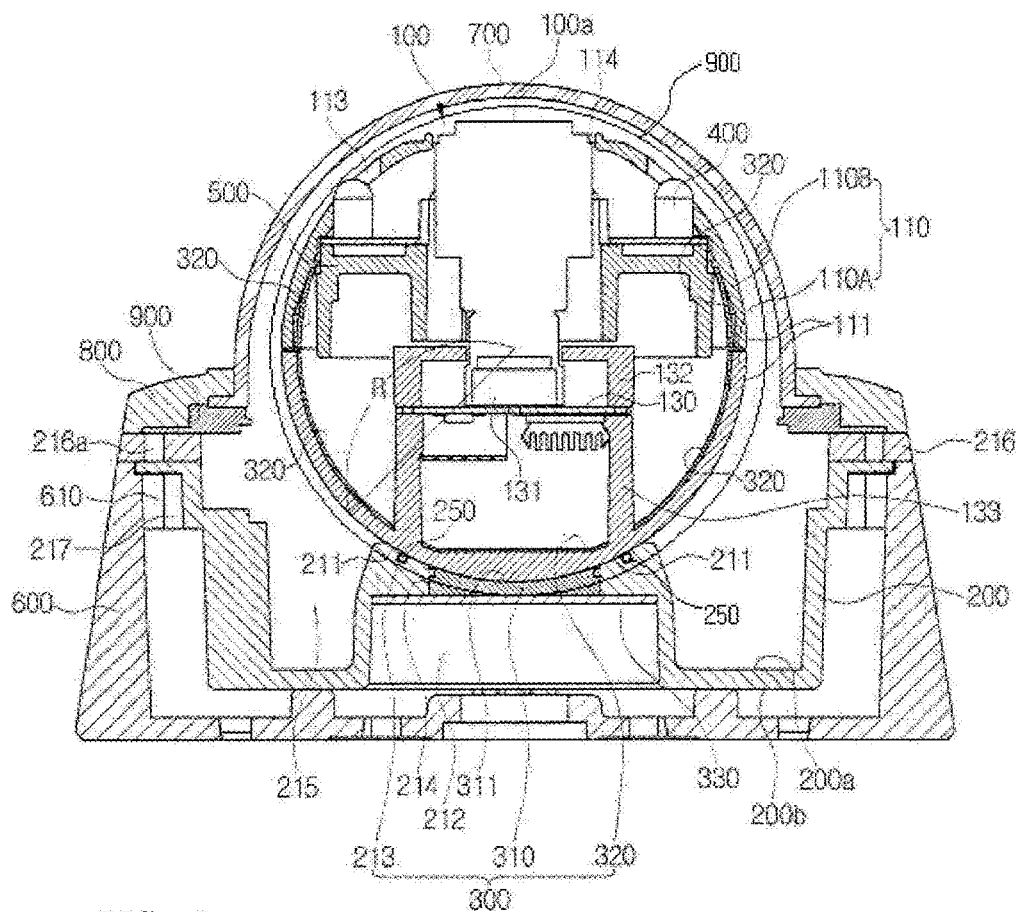
FIG. 5 is a cross-sectional view showing a protective cover.

FIG. 5 shows that a transparent semi-spherical protective window 700 surrounds the rotating body 110 thereby protecting the body from external force. The protective window 700 is mounted on the flange 216, and surrounds the camera lens device 100 together with a finish ring 800 that is assembled with screws (not shown).

A spacer 900 is provided between the flange 216 of the base 200 and a flange 710 of the protective window 700 in a way that the flange 710 closely contacts the finish ring 800.

While the invention has been shown and described with reference to different embodiments thereof, it will be appreciated by those skilled in the art that variations in form, detail, compositions and operation may be made without departing from the spirit and scope of the invention as defined by the accompanying claims. For example, the rotating guide surface 211 may be formed convex and the rotation surface 111 may be formed concave.

What is claimed is:

1. A monitoring camera comprising:
    a) a camera portion that senses image of a object;
    b) a base; and
    c) a shooting angle change device that connects the camera portion and the base with magnetic force;
    wherein the shooting angle change device can change the shooting direction of the camera portion along X-axis, Y-axis, and Z-axis while the camera portion and the base are connected with magnetic force,
    wherein the shooting angle change device comprises;
    1) a rotation guide surface that is formed on the base, wherein the rotation guide surface is curved;
    2) a rotation surface that is formed on the camera portion, wherein the rotation surface contacts the rotation guide surface, wherein the rotation surface can be rotated relative to the base;
    3) a magnet that is provided inside one of the camera portion and the rotation guide surface; and
    4) an attaching member that is provided inside the other of the camera portion and the rotation guide surface, wherein the attaching member is made of magnetic substance, whereby the rotation surface of the camera portion and the rotation guide surface of the base contact with each other, wherein the magnet is installed inside the base, wherein a magnet installation recess is provided so that the magnet can be inserted from a side that is opposite to the rotation guide surface, wherein a magnetic shield plate is provided to prevent falling of the magnet that is installed in the magnet installation recess and to guide the magnetic force of the magnet toward the rotation guide surface, wherein the magnetic shield plate is made of magnetic substance.

2. The monitoring camera of claim 1, wherein the rotation guide surface is formed on the end of a projection that protrudes vertically from a bottom surface of the base, wherein the rotation guide surface is provided at a height that enables the camera portion be rotated so that the shooting direction is parallel to the bottom surface, wherein either the magnet or the attaching member is provided in an area that keeps magnetic attachment when the shooting direction of the camera portion is parallel to the bottom surface.

3. The monitoring camera of claim 1, wherein the camera portion includes a camera lens device and a rotating body that supports the camera lens device and includes the rotation surface.

4. The monitoring camera of claim 3, wherein the magnet is installed in the base and the rotating body is made of non-magnetic substance, wherein the attaching member is separately installed in the rotating body.

5. The monitoring camera of claim 3, wherein the magnet is installed in the base, wherein the attaching member is formed as the rotating body itself.

6. The monitoring camera of claim 3, wherein the magnet is installed in the rotating body, wherein the attaching member is made of ferromagnetic substance and formed as the base itself.

7. The monitoring camera of claim 3, wherein the magnet is installed in the rotating body, and the attaching member is separately provided in the base, wherein the base is made of non-magnetic substance.

8. The monitoring camera of claim 3, wherein the rotating body is injection-molded with plastic and the attaching member is embedded in the molded rotating body.

9. The monitoring camera of claim 3, wherein the rotating body has a spherical shape.

10. The monitoring camera of claim 9, wherein the rotating body is made as a hollow sphere with an opening, wherein the camera lens device is installed inside the rotating body, wherein the camera lens device comprises a lens that is exposed through the opening.

11. The monitoring camera of claim 10, further comprising a magnetic shield that prevents magnetic filed from reaching the camera lens device.

12. The monitoring camera of claim 11, wherein the magnetic shield is made of aluminum and dissipates heat.

13. The monitoring camera of claim 1, further comprising a position securing device that prevents movement of the camera portion relative to the base when external force is applied.

14. The monitoring camera of claim 13, wherein the position securing device comprises a friction member, wherein the friction member is disposed on either the rotation guide surface of the shooting angle change device or the rotation surface of the shooting angle change device.

15. The monitoring camera of claim 1, wherein the magnet comprises an exposed magnetic surface, wherein the magnet is installed either in the base or in the camera portion so that the exposed magnetic surface is exposed toward either the rotation guide surface or the rotation surface, wherein the exposed magnetic surface has the same curvature as the curvature of the rotation guide surface.

* * * * *